(12) United States Patent
Toyofuku

(10) Patent No.: US 7,073,928 B2
(45) Date of Patent: Jul. 11, 2006

(54) VEHICLE HEADLIGHT

(75) Inventor: Kenji Toyofuku, Shizuoka-ken (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/838,657

(22) Filed: May 4, 2004

(65) Prior Publication Data

US 2004/0257821 A1 Dec. 23, 2004

(30) Foreign Application Priority Data

May 22, 2003 (JP) ............................. 2003-145410

(51) Int. Cl.
*F21V 1/00* (2006.01)
(52) U.S. Cl. .................. 362/509; 362/37; 362/516
(58) Field of Classification Search .................. 362/509
See application file for complete search history.

(56) References Cited

U.S. PATENT DOCUMENTS

| 1,465,549 | A | * | 8/1923 | Gilchrist | ..................... 362/546 |
| 2,169,531 | A | * | 8/1939 | Jennings | ..................... 362/292 |
| 5,219,444 | A | * | 6/1993 | Chiaramonte et al. | ...... 362/464 |
| 6,074,079 | A | * | 6/2000 | Yanagihara et al. | ........ 362/509 |
| 6,390,656 | B1 | | 5/2002 | Suda et al. | |

FOREIGN PATENT DOCUMENTS

| DE | 195 40 554 | 10/1995 |
| GB | 505205 | 5/1939 |
| JP | 61-25589 | 6/1986 |
| JP | 2000-233779 | 8/2000 |
| JP | 2000-311514 | 11/2000 |
| JP | 2002-274253 | 9/2002 |

* cited by examiner

*Primary Examiner*—Renee Luebke
*Assistant Examiner*—Leah S. Lovell
(74) *Attorney, Agent, or Firm*—Hogan & Hartson LLP

(57) ABSTRACT

A vehicle headlight includes a body case fixed to a vehicle body, a lens provided in front of the body case, a lamp bulb facing an inner space formed by the body case and the lens and an intermediate member interposed between the body case and the lens so as to be exposed to an external environment. The body case and the intermediate member are arranged with their end faces opposing each other, and the lens and the intermediate member are arranged with their end faces opposing each other.

26 Claims, 9 Drawing Sheets

VEHICLE HEADLIGHT

BACKGROUND OF THE INVENTION

1. Field of the Invention

The present invention relates to a vehicle headlight mounted to a vehicle body.

2. Description of the Related Art

A conventional vehicle headlight mounted to a vehicle body generally has a body case fixed to the vehicle body, a lens provided in front of the body case and covering the front of a lamp bulb, and a reflector attached to the rear of or behind the lamp bulb. Another conventional vehicle headlight has an extension provided in front of the reflector to cover around the headlight and includes an opening to fit the inner side of the lens.

Such a vehicle headlight includes a rubber sealing member having a channel shaped cross section provided around an edge of a recess, for storing the headlight, formed on the front part of a motorcycle fairing. The sealing member has a slot formed between its inner and outer pieces and opened to the inner side of the recess. The outer piece of the sealing member is bent outward in order to accommodate the peripheral edge of the headlight shield inside the slot.

A vibration damping system may also be provided for a motorcycle headlamp. This uses an injection-molded damping material formed integral with the inner surface of a bottom portion of the headlamp housing.

Another conventional vehicle headlight, including a bowl-shaped reflector with a front opening, a cylindrical socket having a bulb attached to the bottom of the bowl-shaped reflector, and a lens provided in order to cover the opening of the reflector, further has a vent hole structure with a hood extending from the reflector to cover an upper surface of the socket. A cutout is bored in an upper part of the socket so as to extend in the direction of an axis thereof. The cutout allows a closed space in the reflector to communicate with the exterior, thus causing air to flow. The hood inhibits water from invading into the cutout.

Another conventional motorcycle headlight includes a lamp bulb, reflector, and lens. The reflector has a protrusion, formed at its edge, on which an emblem is formed, so that the lens can entirely cover the protrusion and emblem.

These conventional vehicle headlights still require improvements in their external appearance. Its attachment construction, between the lens and reflector, and between the lens and body case, is exposed to the outer environment, on which projections and recesses are formed. This spoils the external appearance of the headlight.

An advantage of the present invention is to provide an improved vehicle headlight with better external appearance, and therefore, to overcome the above problems with the conventional vehicle headlight.

SUMMARY OF THE INVENTION

In order to achieve the above advantage, the present invention provides a vehicle headlight having a body case fixed to a vehicle body, a lens provided in front of the body case and a lamp bulb facing an inner space formed by the body case and the lens. An intermediate member is interposed between the body case and the lens so as to expose to the external environment. The body case and the intermediate member are arranged with their end faces opposing each other, and the lens and the intermediate member are arranged with their end faces opposing each other.

In the vehicle headlight described above, the body case and the intermediate member are arranged with their end faces opposing each other, and the lens and the intermediate member are arranged with their end faces opposing each other. In other words, this prevents the body case from overlying the intermediate member while preventing the lens from overlying the intermediate member. Therefore, the body case, the intermediate member and the lens are arranged with their outer surfaces generally flush with each other. This improves the external appearance of the vehicle headlight.

The present invention provides a vehicle headlight having a body case fixed to a vehicle body and a lens provided in front of the body case. The intermediate member is interposed between the body case and the lens so as to expose to the external environment, thereby shielding a joint between the body case and the lens.

In the vehicle headlight described above, the intermediate member shields the joint between the body case and the lens, which improves the external appearance of the vehicle headlight.

In the above vehicle headlight of the present invention, the intermediate member is interposed between the body case and the lens in order to be exposed to the external environment. The body case and the intermediate member are arranged with their end faces opposing each other, and the lens and the intermediate member are arranged with their end faces opposing each other. This intermediate member may also shield the joint between the body case and the lens.

This can further improve the external appearance of the vehicle headlight.

The intermediate member may be formed using a non-transparent material or it could serve as a reflector. The intermediate member may be formed using a transparent material, which could be painted to any color, or formed using a transparent material with its backside painted, or with a non-transparent member attached, or formed using a non-transparent member.

In the vehicle headlight of the present invention, the body case and the lens may be connected to each other via the intermediate member.

In this vehicle headlight, a rib may be provided inside of the body case, and a recess for receiving the rib may be formed inside of the intermediate member so that the rib and the recess are fixedly connected to each other. Alternatively, the rib may be provided adjacent to the outer surface of the body case, and the recess may be formed adjacent to the outer surface of the intermediate member. This allows the body case, the lens and the intermediate member to be arranged with their outer surfaces flush with each other with increased accuracy as well as the advantages described above. This also improves joint strength between the body case, the lens, and the intermediate member.

Also, in this vehicle headlight, a rib may be provided inside of the intermediate member, and a recess for receiving the rib may be formed inside of the body case so that the rib and the recess are fixedly connected to each other. Alternatively, the rib may be provided adjacent to the outer surface of the intermediate member, and the recess may be formed adjacent to the outer surface of the body case. This allows the body case, the lens and the intermediate member to be arranged with their outer surfaces flush with each other with increased accuracy as well as the advantages described above. This also improves joint strength between the body case, the lens, and the intermediate member.

Furthermore, in the vehicle headlight of the present invention, the lens and the intermediate member may be connected to each other by welding their inner surfaces together.

DETAILED DESCRIPTION OF THE PREFERRED EMBODIMENTS

Descriptions are next made of a vehicle headlight according to preferred embodiments of the present invention with reference to drawings.

The preferred embodiments to be described later are examples of the present invention and not limited the technical scope of the present invention. Thus, it should be apparent that various changes and modifications could be made without departing from the scope of the invention.

Figure 1:
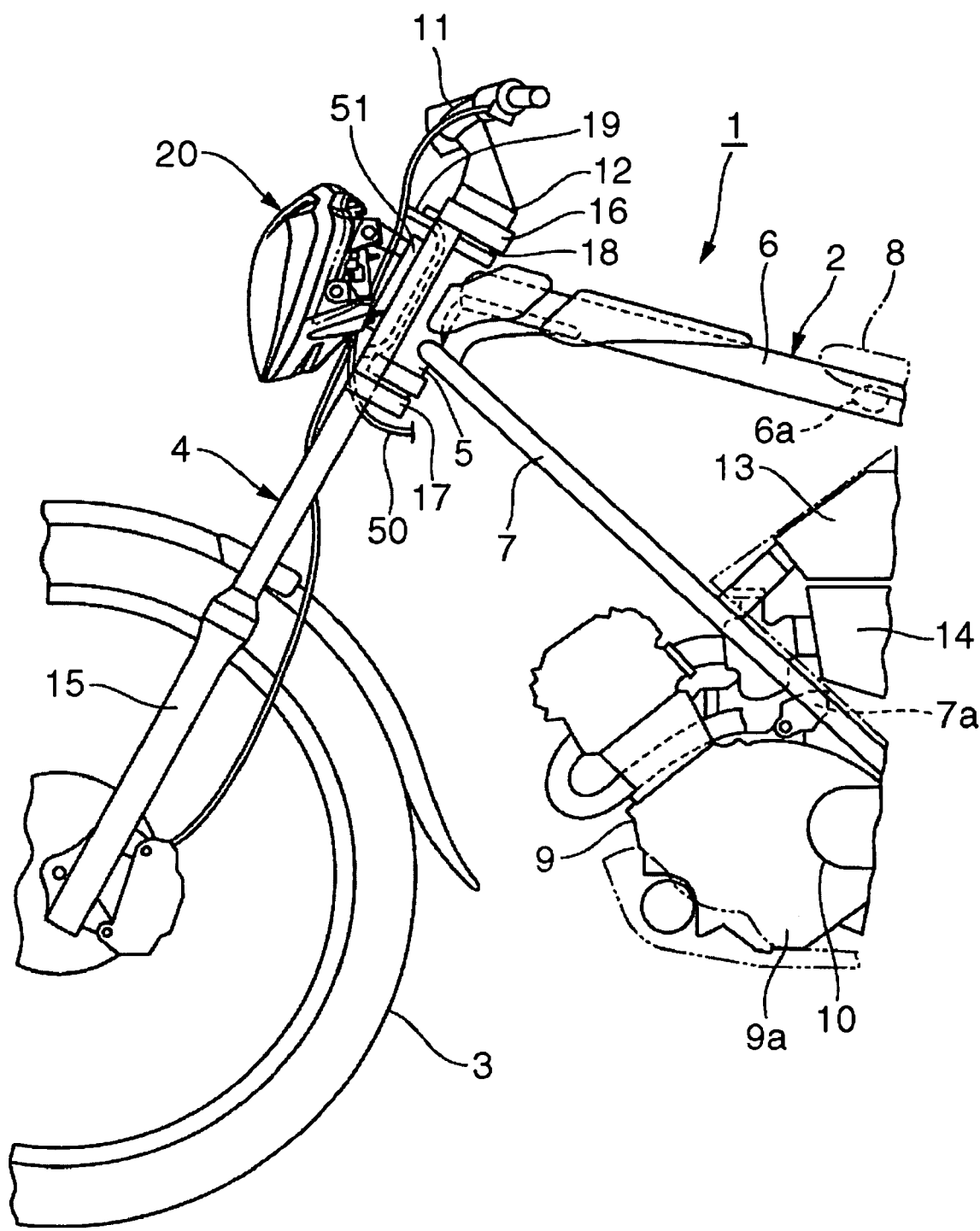
FIG. 1 is a left side view showing part of a motorcycle provided with a headlight according to an embodiment of the present invention.
Figure 2:
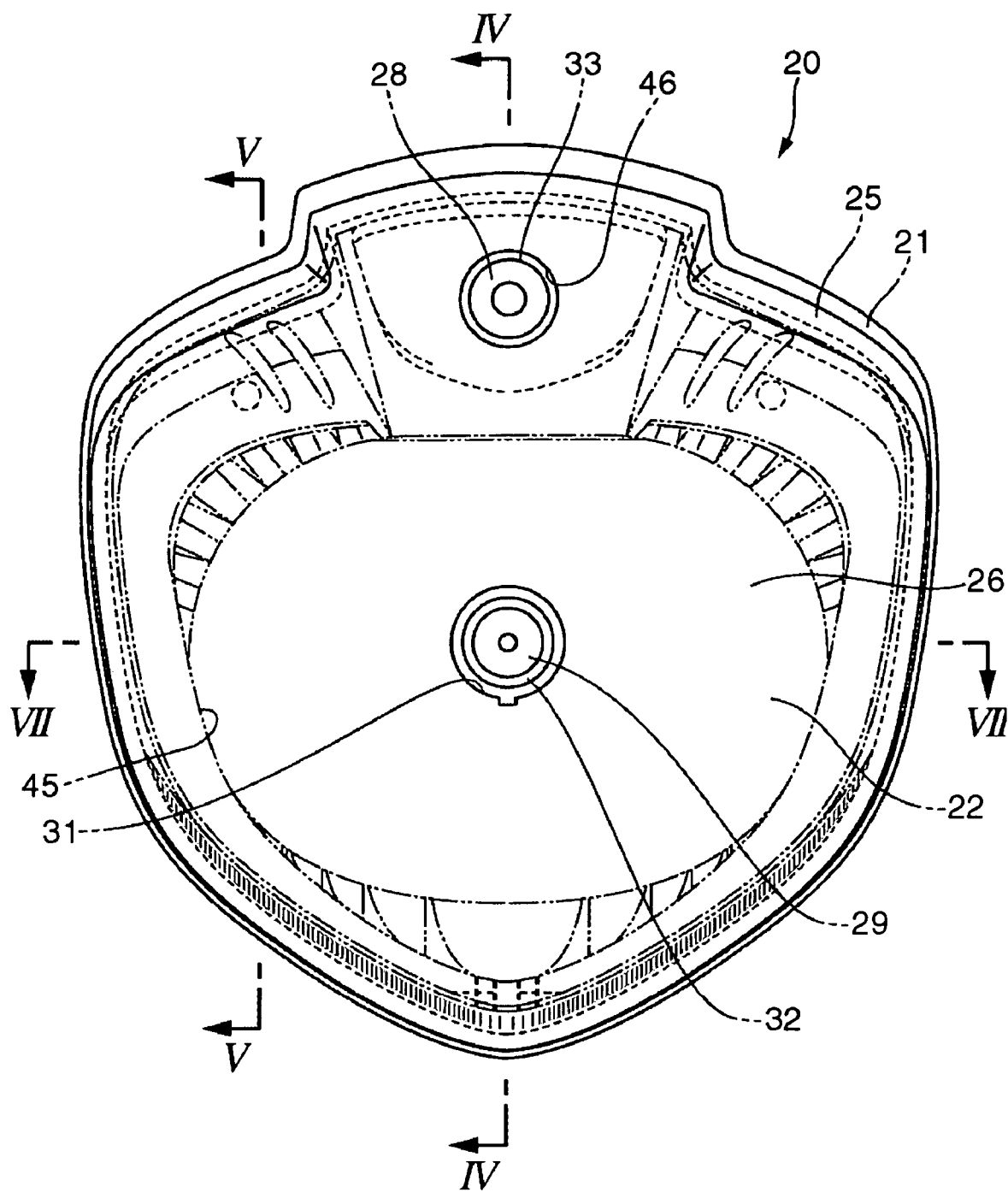
FIG. 2 is a schematic view of a front side of the headlight in FIG. 1.
Figure 3:
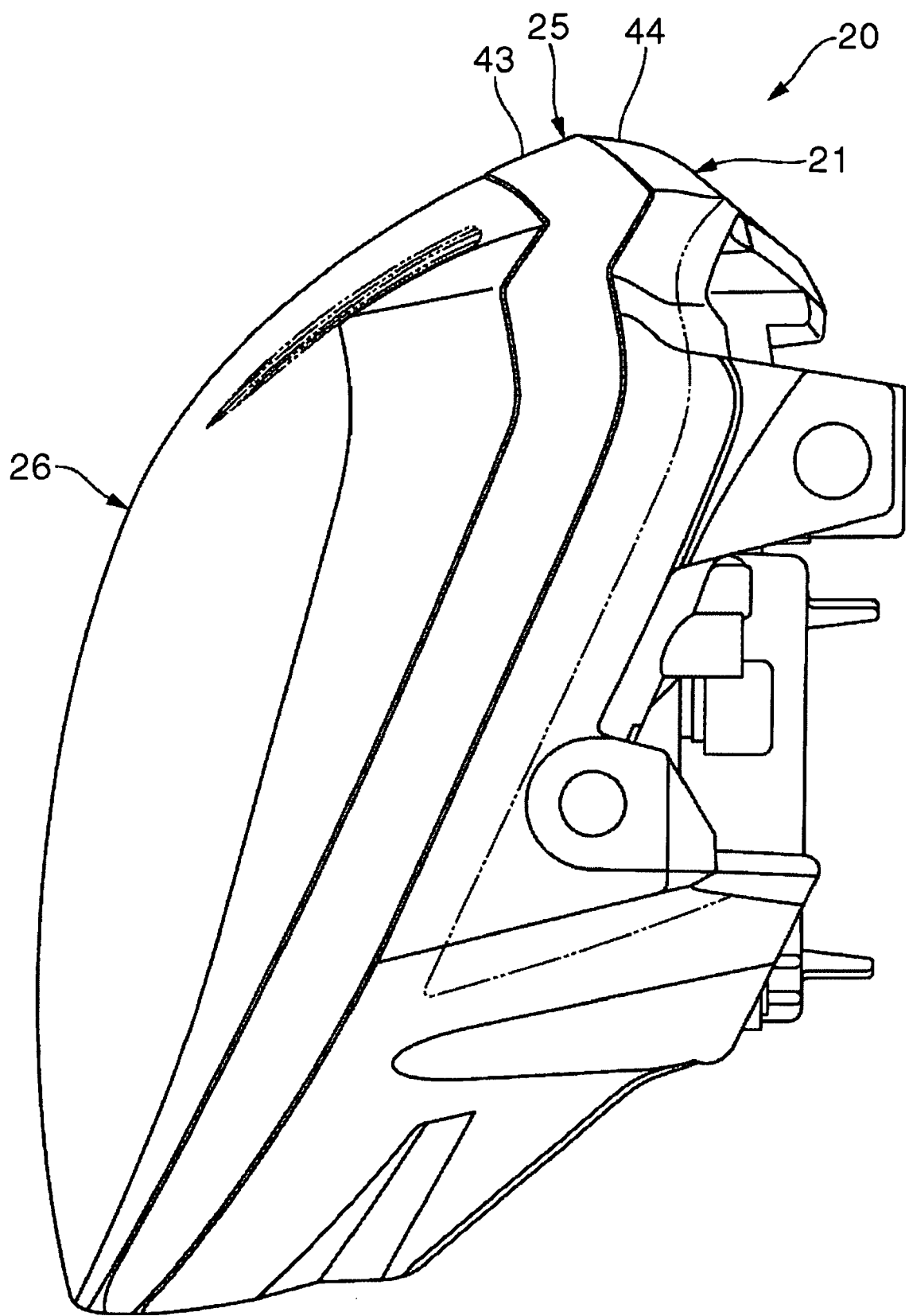
FIG. 3 is a left side view of the headlight in FIG. 2.
Figure 4:
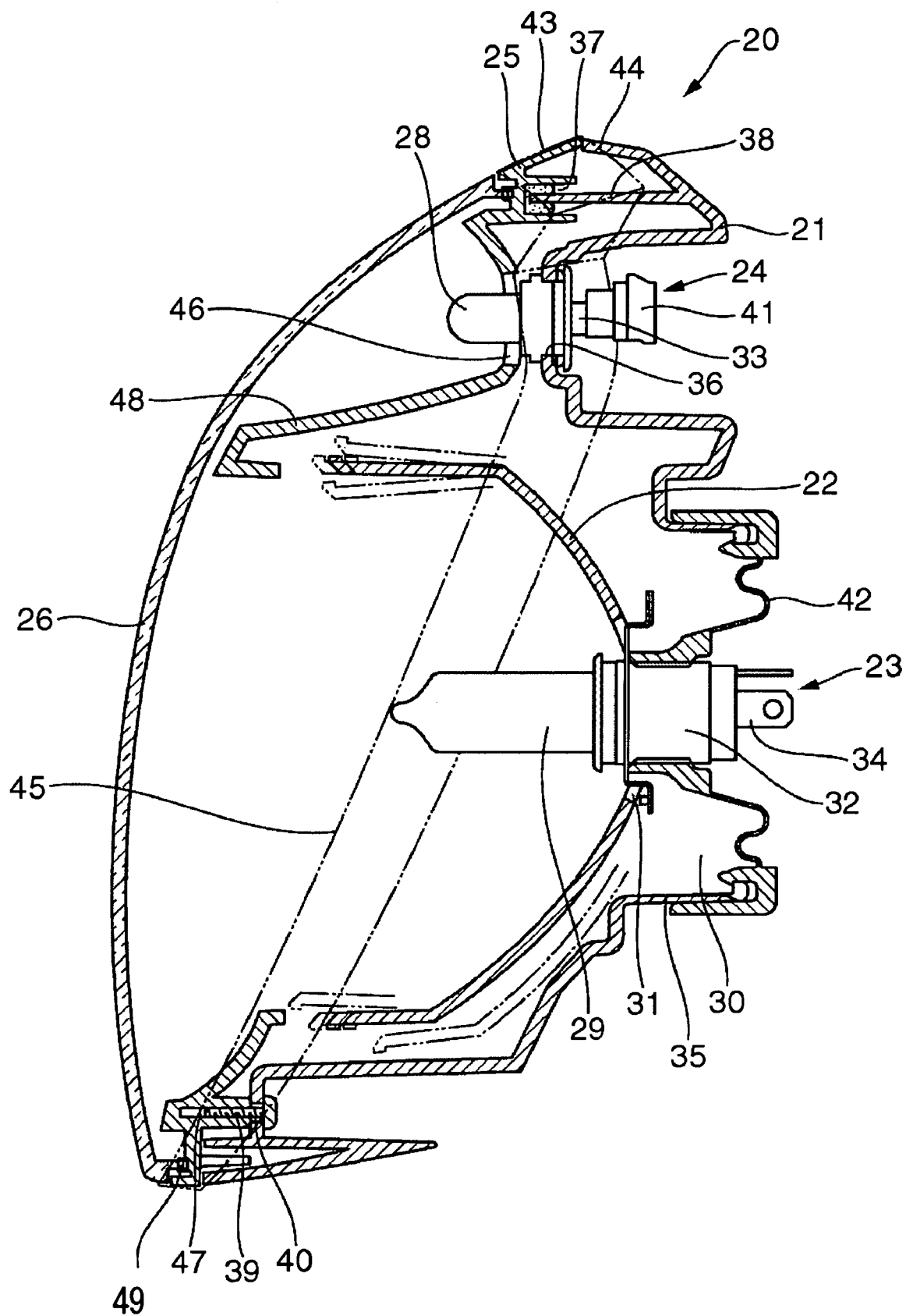
FIG. 4 is a sectional view taken along the line IV—IV of FIG. 2.
Figure 5:
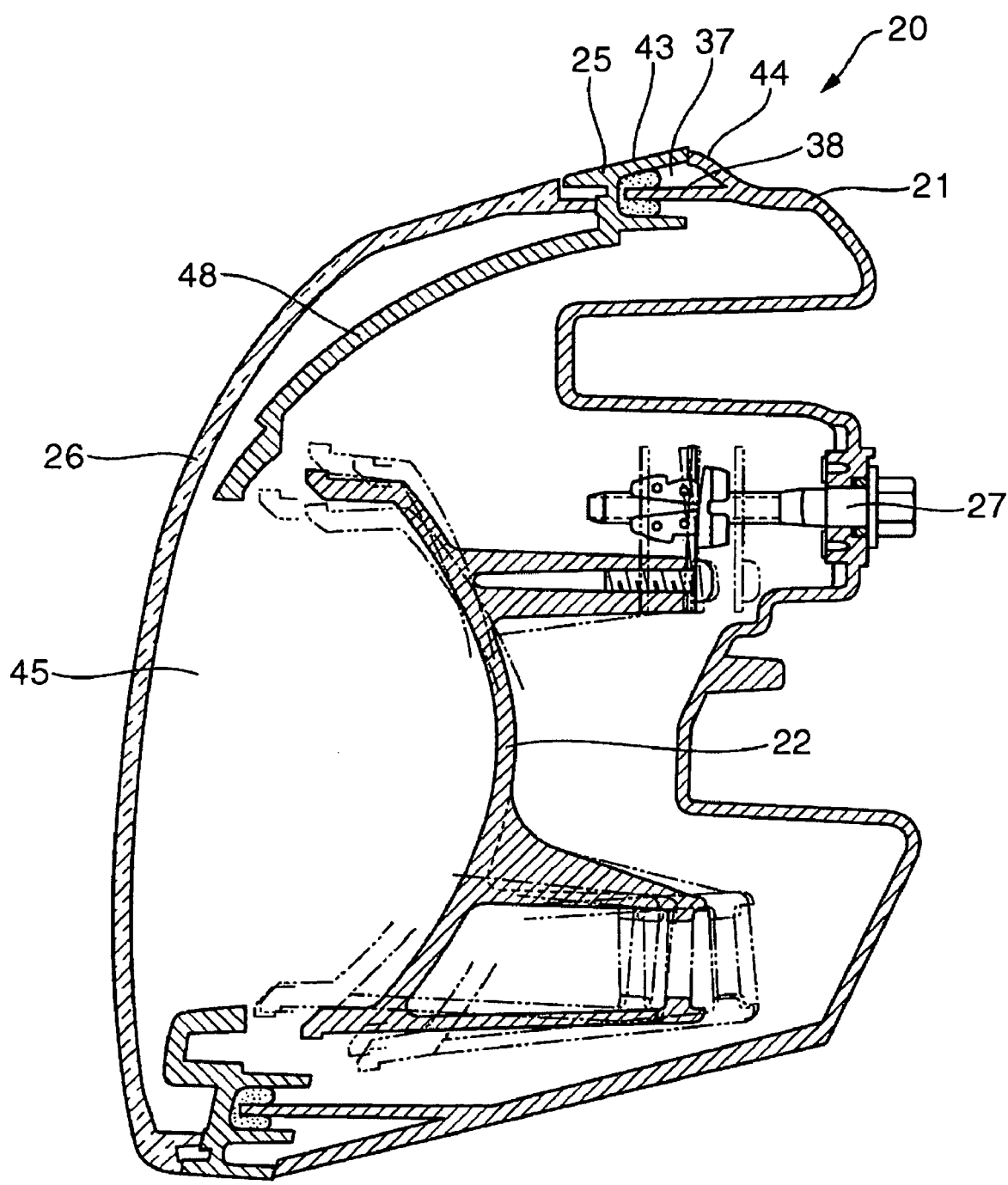
FIG. 5 is a sectional view taken along the line V—V of FIG. 2.
Figure 6:
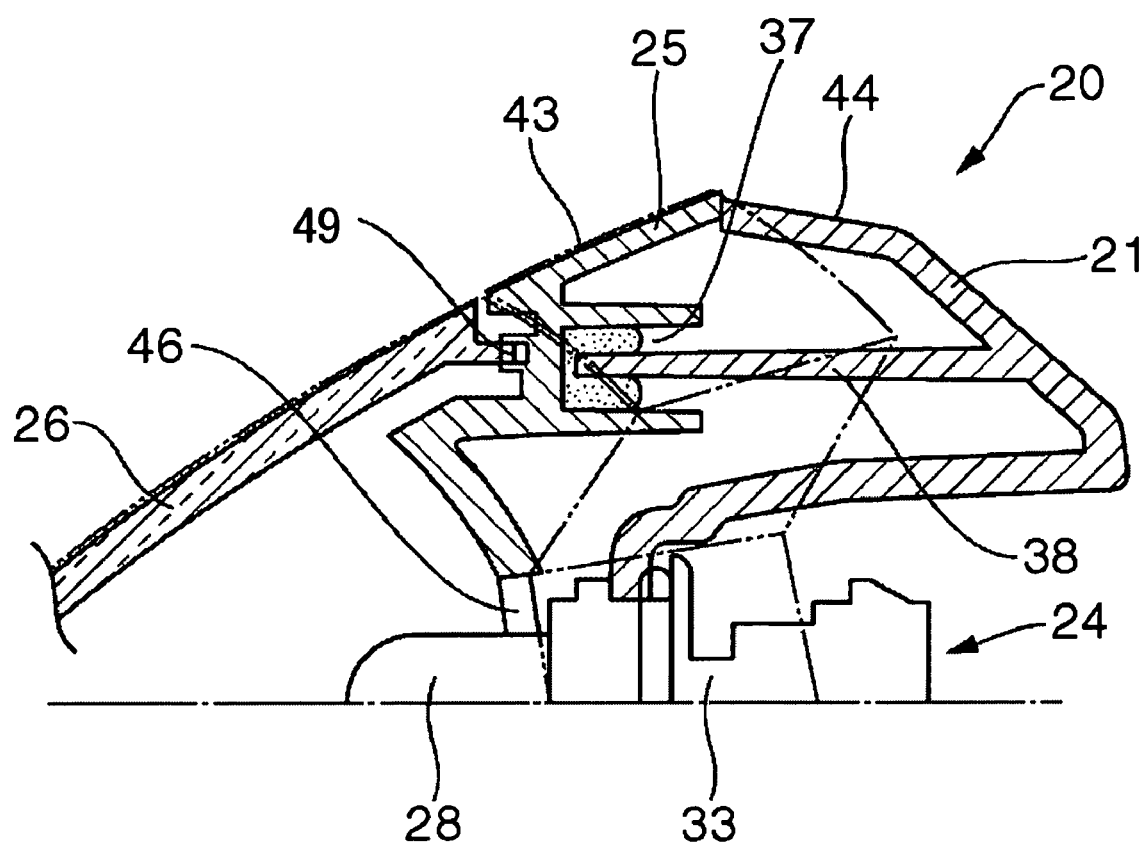
FIG. 6 is an enlarged sectional view showing a construction in which a lens, an extension and a body case of the headlight in FIG. 4 are attached to each other.
Figure 7:
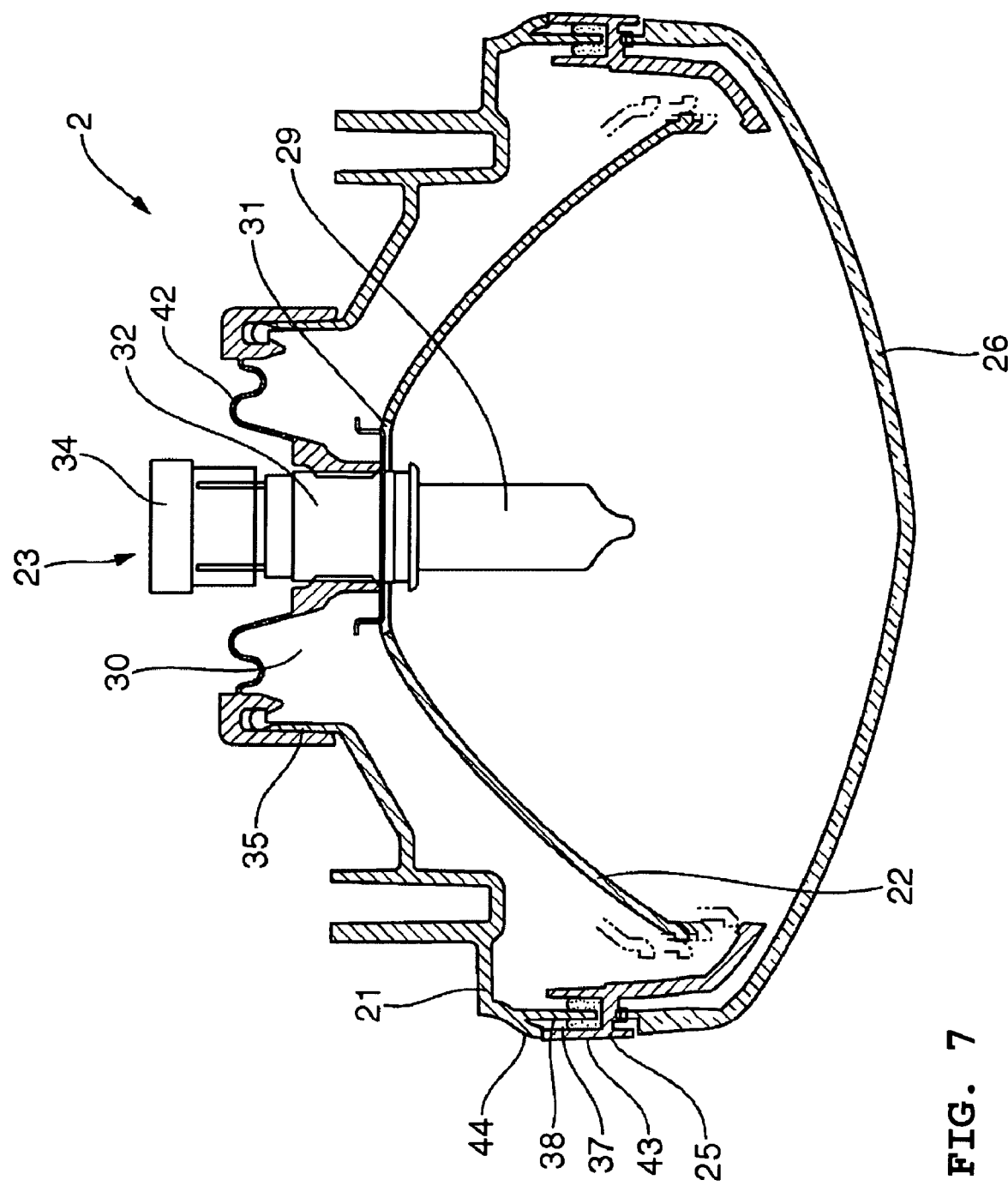
FIG. 7 is a sectional view taken along the line VII—VII of FIG. 2.
Figure 8:
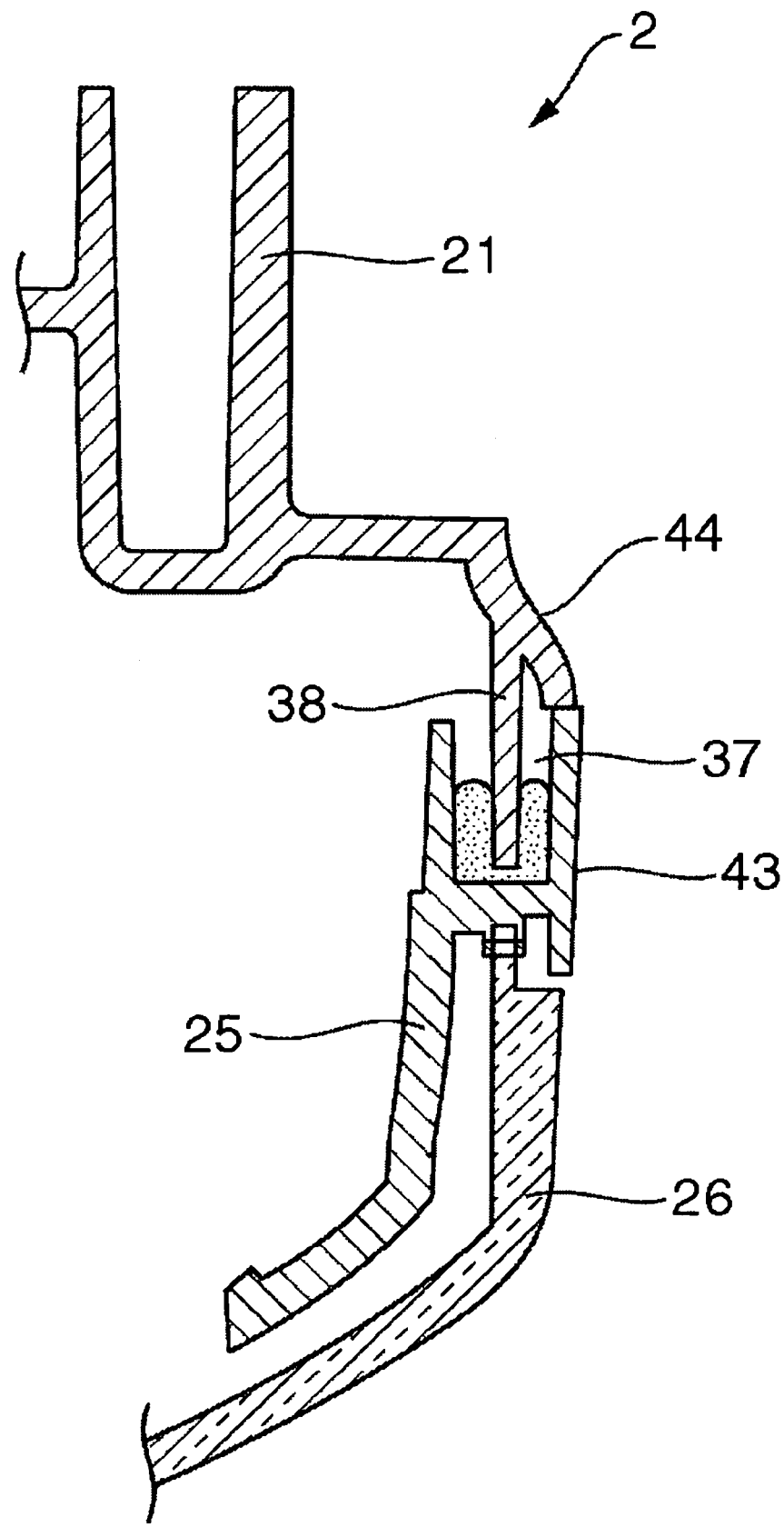
FIG. 8 is an enlarged sectional view showing a construction in which a lens, an extension and a body case of the headlight in FIG. 7 are attached to each other.

FIG. 1 is a left side view showing part of a motorcycle provided with a headlight according to an embodiment of the present invention. FIG. 2 is a schematic view of a front side of the headlight in FIG. 1. FIG. 3 is a left side view of the headlight in FIG. 2. FIG. 4 is a sectional view taken along the line IV—IV of FIG. 2. FIG. 5 is a sectional view taken along the line V—V of FIG. 2. FIG. 6 is an enlarged sectional view showing a construction in which a lens, an extension and a body case of the headlight in FIG. 4 are attached to each other. FIG. 7 is a sectional view taken along the line VII—VII of FIG. 2. FIG. 8 is an enlarged sectional view showing a construction in which a lens, an extension and a body case of the headlight in FIG. 7 are attached to each other.

The terms, front, rear, left and right, used herein are meant to be front, rear, left and right if viewed by the rider seated on the motorcycle (the front indicates a heading direction).

A motorcycle 1 with a headlight 20 according to an embodiment of the present invention shown in FIG. 1 can run on public roads as well as on rough terrain. A vehicle frame 2 of the motorcycle 1 includes a head pipe 5 for supporting a front fork 4 with a front wheel 3 to be rotatable, and a main pipe 6 as well as down tubes 7 which are welded to the head pipe 5. The main pipe 6 is provided at the center of the vehicle in the vehicle's width direction, which separates the vehicle into a left and a right side below the front end of a seat 8. An engine 9 is mounted below the left and right down tubes 7.

The engine 9 includes a crankcase 9a with its front part supported by a cross member 7a and its rear part supported by a lower end of left and right seat pillars (not shown). The engine 9 drives a rear wheel (not shown) via a shaft drive type power transmission device 10. Reference numerals 13 and 14 denote a fuel tank and an air cleaner, respectively.

The front fork 4 includes a telescopic front fork body 15 with a pair of left and right forks, and a pair of bracket, upper bracket 16 and lower bracket 17 to support the upper part of the front fork body 15. The upper bracket 16 and the lower bracket 17 are rotatably supported by the head pipe 5 via a steering shaft 18. A headlight stay 19 is attached to the front of the upper bracket 16 and the lower bracket 17. A removable headlight 20 is attached thereto via the headlight stay 19. Steering handlebars 11 are mounted to the top of the upper bracket 16 via a handlebar holder 12. A connector storage box 51 is fixed to an area where the headlight stay 19 extends along the front fork body 15. This is designed to store connectors (not shown) for lead wires of electrical components adjacent to the steering handlebars 11 to be plugged into a main harness 50 of power lead wires.

As shown in FIGS. 1 through 8, the headlight 20 has a body case 21 fixed to the headlight stay 19, a reflector 22 provided on the front of the body case 21, a lamp 23 protruding forward from the approximately center part of the reflector 22, a position lamp 24 provided above the reflector 22 of the body case 21, an extension 25 as an intermediate member, which has an opening for the reflector 22 and a position bulb 28 of the position lamp 24 to be exposed to the outer environment, and which is mounted to the front of the body case 21, and a lens 26 mounted to the front of the extension 25 and covering forward of the body case 21.

The body case 21 has an opening 30 at its approximately center part, into which the lamp 23 is inserted. The opening 30 is defined by an approximately cylindrical sidewall 35 protruding rearward. A sealing member 42 designed to seal an area between the lamp 23, to be described later, and the opening 30 is fixed to the sidewall 35. The body case 21 has an opening 36 formed above its approximately center part for the position bulb 28 of the position lamp 24 to be exposed to the outer environment. Adjacent to the inner side of an outer peripheral face 44 at the front part of the body case 21, a rib 38 is provided so that a recess 37, formed on the extension 25 to be described later, receives it. Adjacent to the inner side of an outer periphery at the bottom part of the body case 21, a screw hole 40 is formed through which a screw 39 for fixing the extension 25 to the body case is inserted.

The reflector 22 looks like an oval if viewed from the front to the rear (see FIG. 2) and is formed into a recess like a bowl with its opening facing towards the front (see FIGS. 4, 5, and 7). The reflector 22 has an opening 31 at its approximately center part, through which the lamp bulb 23 is inserted towards the front. As shown by double-dashed lines in FIG. 5, an optical axis adjuster 27 attached to the body case 21 can move to the front or rear, which allows the reflector 22 to swing in order to adjust the optical axis.

The lamp 23 has the lamp bulb 29 and a socket 32 provided at the rear of the lamp bulb 29. At the rear end of the socket 32, a connector receiver 34 for connecting a connector is provided at one end of a lead wire supplying electric current to the lamp bulb 29. A connector provided at the other end of the lead wire, in turn, is connected to a connector (not shown) stored in the connector storage box

51. The lamp 23 is attached to the body case 21 with the socket 32 fixed to the sidewall 35 of the body case 21 via the sealing member 42.

The position lamp 24 has the position bulb 28 and a socket 33 provided at the rear of the position bulb 28. At the rear end of the socket 33, a connector receiver 41 for connecting a connector is provided at one end of a lead wire supplying electric current to the position bulb 28. A connector provided at the other end of the lead wire, in turn, is connected to a connector (not shown) stored in the connector storage box 51.

The extension 25 has an outer periphery 43 with a width from front to rear. It is attached to the body case 21 with its end face opposing a front-end face of the body case 21 (end face opposing the extension 25). In other words, this prevents the extension 25 from overlying the body case 21, thereby arranging them with their outer surfaces generally flush with each other. This improves its external appearance of the vehicle headlight.

The extension 25 has an opening 45 formed through its approximately center part to allow the reflector 22 to be exposed to the front, as well as an opening 46, through which the position bulb 28 is inserted so as to be exposed to the front. Between the openings 45 and 46, a hood 48 is formed, which extends towards the front in order to separate a light beam emitted from the lamp bulb 29 from a light beam from the position bulb 28. Adjacent to the inner side of the outer periphery 43 of the extension 25, the recess 37 is formed into which a tip end of the rib 38 of the body case 21 is received.

Adjacent to the inner side of the bottom part of the outer periphery 43 of the extension 25, a screw hole 47 is formed, through which the screw 39 is inserted. This screw hole can communicate with the screw hole 40 of the body case 21. The extension 25 receives the rib 38 of the body case 21 in its recess 37 in order to be attached to the body case 21 using resin, adhesive, or the like filled in the recess 37. This improves joint strength between the body case 21 and the extension 25, while allowing them to be arranged with the outer surfaces of the body case 21 and the extension 25 generally flush with each other.

The extension 25 has the outer periphery 43 with its outer surface exposed to the outer environment as shown in FIGS. 3 through 8. It is also attached to the body case 21 with the outer surface generally flush with the outer surface of the outer peripheral face 44 of the body case 21 almost in the same vertical height. A joint between the extension 25 and the body case 21 is shielded with the outer periphery 43 of the extension 25 in order not to be exposed to the outer environment. The screw hole 40 of the body case 21, and the screw hole 47 of the extension 25 are aligned with each other. Thus, when the screw 37 is screwed in, the extension 25 can be attached to the body case 21.

The extension 25 and the body case 21 may abut (contact) each other on their opposing end faces or may have a gap therebetween. The extension 25 allows the headlight 20 to have various designs at low cost. For example, the extension may be painted to any desired color or may be formed using a transparent material with its backside, that is, inner side, painted.

The lens 26 is attached to the extension 25 with its end face opposing a front-end face of the extension 25 (the end face opposing the lens 26) as particularly shown in FIGS. 3 through 8. In other words, this prevents the lens 26 from overlying the extension 25, thereby arranging them with their outer surfaces generally flush with each other. The lens 26 is attached to the extension 25 with their respective portions, which are adjacent to the inner side of their opposing end faces, sealed with a sealing material 49 (e.g. hot-melt adhesive or other equivalent sealing materials with the same characteristics). The outer periphery 43 of the extension 25 shields a joint between the lens 26 and the extension 25 via the sealing material 49 in order not to be exposed to the outer environment. This improves the external appearance of the headlight 20.

The extension 25 and the lens 26 may abut (contact) each other on their opposing end faces or may have a gap therebetween.

In the headlight 20 according to the present invention, the extension 25 is interposed between the body case 21 and the lens 26 so as to be exposed to the outer environment. The body case 21 and the extension 25 are arranged with their end faces opposing each other. The lens 26 and the extension 25 are arranged with their end faces opposing each other. Therefore, the body case 21, the lens 26 and the extension 25 can be arranged with their outer surfaces generally flush with each other. The extension 25 can shield respective joints between the body case 21 and the extension 25, and between the extension 25 and the lens 26, in order not to be exposed to the outer environment. This improves the external appearance of the vehicle headlight.

In the embodiment of the present invention, the extension 25 is used as an intermediate member interposed between the body case 21 and the lens 26. However, alternatively, the intermediate member, exposed to the outer environment, may be arranged with the body case 21 with their end faces opposing each other, while being arranged with the lens 26 with their end face opposing each other. As a further alternative, the intermediate member, exposed to the outer environment, may shield the joints between the body case 21 and the lens 26.

To be more specific, the position lamp 24 is provided in any location other than the body case 21, and the ends of the reflector 22 are extended to between the body case 21 and the lens 26 in order to be exposed to the outer environment. In addition, the reflector 22 and the body case 21 are arranged with their end faces opposing each other, and the reflector 22 and the lens 26 are arranged with their end faces opposing each other. Alternatively, the reflector as the intermediate member, exposed to the outer environment, may shield the joints between the body case 21 and the lens 26.

The hood 48 and the reflector 22 may be formed as a single unit. In this case, adjustment of the optical axis can be achieved by moving the entire headlight 20 relative to the vehicle body. Alternatively, the intermediate member may serve as a reflector for the position bulb 28.

Figure 9:
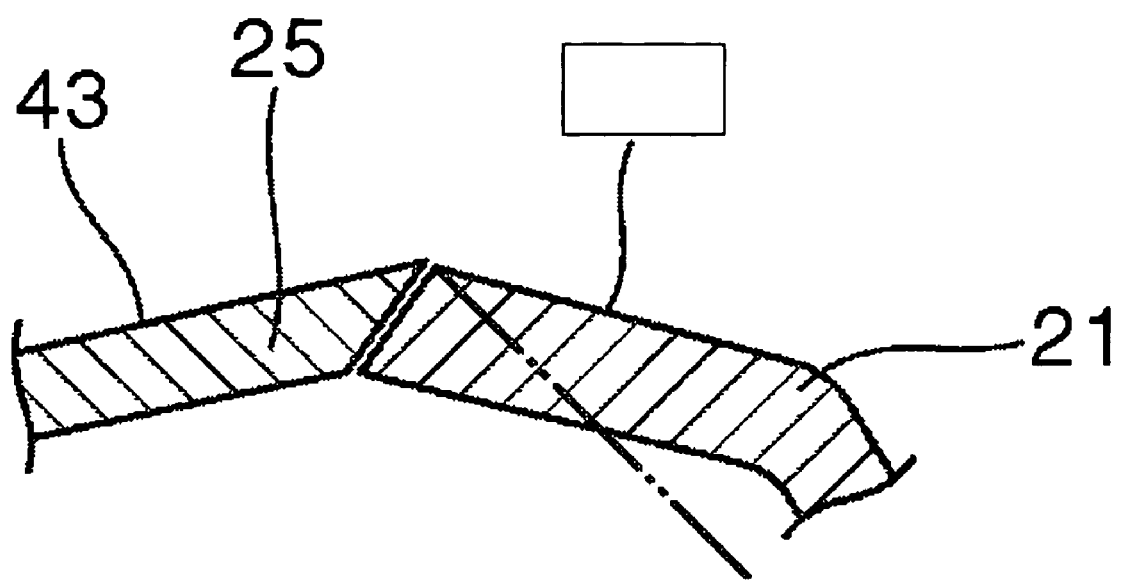
FIG. 9 is an enlarged sectional view showing a construction in which an extension and a body case of a headlight, according to another embodiment of the present invention, are attached to each other.

In the embodiment of the present invention, as shown in FIG. 9, the end face of the body case 21 opposing the extension 25 may be formed into a slant face with its inner surface extending longer than its outer surface towards the extension 25. In turn, the end face of the extension 25 opposing the body case 21 may also be formed into a slant face in order to correspond to the slant face. Therefore, the body case 21 and the extension 25 can be arranged with their end faces opposing each other. In this case, it does not matter which surface (inner or outer surface) of the end face of the body case extends longer than the other surface towards the extension in order to correspond to the opposing end face. However, it is preferable that the body case and the extension have their respective slant end faces as shown in FIG. 9 in order to have an improved external appearance viewed from the front.

Furthermore, in the embodiment of the present invention, the rib 38 is provided adjacent to the inner side of the outer peripheral face 44 at the front part of the body case 21. Also, the recess 37 is formed adjacent to the inner side of the outer periphery 43 of the extension 25, into which the tip end of the rib 38 of the body case 21 is received. However, the present invention is not limited to the above configuration. It should be understood that the recess 37 may be alternatively formed adjacent to the inner side of the outer peripheral face 44 at the front part of the body case 21, so that the rib 38 could be provided adjacent to the inner side of the outer periphery 43 of the extension 25 in order to be received into the recess 37.

In the embodiment of the present invention, the headlight mounted to the motorcycle is described. However, the invention is not limited to that. This headlight may also be mounted to other vehicles including a car.

As described above, in the vehicle headlight of the present invention, the body case and the intermediate member are arranged with their end faces opposing each other, and the lens and the intermediate member are arranged with their end faces opposing each other. Therefore, the body case, the intermediate member and the lens can be arranged with their outer surfaces generally flush with each other. This results in an improved external appearance of the headlight.

Alternatively, the vehicle headlight of the present invention has the intermediate member which may shield the joints between the body case and the lens, improving its external appearance.

What is claimed is:

1. A vehicle headlight comprising:
   a body case fixed to a vehicle body;
   a lens provided in front of the body case;
   a lamp bulb facing an inner space formed by the body case and the lens; and
   an intermediate member interposed between the body case and the lens and comprising an outer periphery that is exposed to an external environment, and a hood formed inwardly of the outer periphery and extending towards a front of the vehicle headlight,
   wherein the body case and the intermediate member are arranged with their end faces opposing each other, and the lens and the intermediate member are arranged with their end faces opposing each other.

2. The vehicle headlight according to claim 1, wherein the intermediate member shields a joint between the body case and the lens.

3. The vehicle headlight according to claim 1, wherein the intermediate member is formed opaquely.

4. The vehicle headlight according to claim 1, wherein the intermediate member serves as a reflector.

5. The vehicle headlight according to claim 1, wherein the body case and the lens are connected to each other via the intermediate member.

6. The vehicle headlight according to claim 5, wherein a rib is provided inside of the body case, and a recess for receiving the rib is formed inside of the intermediate member, so that the rib and the recess are connected to each other in a fixed manner.

7. The vehicle headlight according to claim 6, wherein the rib is provided adjacent to an outer surface of the body case, and the recess is formed adjacent to an outer surface of the intermediate member.

8. The vehicle headlight according to claim 5, wherein a rib is provided inside of the intermediate member, and a recess, for receiving the rib is formed inside of the body case, so that the rib and the recess are connected to each other in a fixed manner.

9. The vehicle headlight according to claim 8, wherein the rib is provided adjacent to an outer surface of the intermediate member, and the recess is formed adjacent to an outer surface of the body case.

10. The vehicle headlight according to claim 5, wherein the lens and the intermediate member are connected to each other by welding their inner surfaces together.

11. The vehicle headlight according to claim 1, wherein the hood is formed between a first opening in a center part of the intermediate member and a second opening in the intermediate member.

12. The vehicle headlight according to claim 11, wherein the lamp bulb is positioned within the first opening in the hood and a position bulb is positioned within the second opening in the hood, and wherein the hood separates a light beam emitted from the Lamp bulb from a light beam emitted from the position bulb.

13. The vehicle headlight according to claim 12, wherein the lamp bulb is positioned within the first opening in the hood and a position bulb is positioned within the second opening in the hood, and wherein the hood separates a light beam emitted from the lamp bulb from a light beam emitted from the position bulb.

14. A vehicle headlight comprising:
    a body case fixed to a vehicle body; and
    a lens provided in front of the body case,
    wherein an intermediate member is interposed between the body case and the lens and comprises an outer periphery that is exposed to an external environment, thereby shielding a joint between the body case and the lens, and a hood formed inwardly of the outer periphery and extending towards a front of the vehicle headlight.

15. The vehicle headlight according to claim 14, wherein the hood is formed between a first opening in a center part of the intermediate member and a second opening in the intermediate member.

16. The vehicle headlight according to claim 15, wherein a lamp bulb is positioned within the first opening in the hood and a position bulb is positioned within the second opening in the hood) and wherein the hood separates a light beam emitted from the lamp bulb from a light beam emitted from the position bulb.

17. A vehicle headlight comprising:
    a body case fixed to a vehicle body;
    a lens provided in front of the body case;
    a lamp bulb facing an inner space formed by the body case and the lens; and
    means for being exposed to an external environment comprising an outer periphery interposed between the body case and the lens, and a hood formed inwardly of the outer periphery and extending towards a front of the vehicle headlight,
    wherein the body ease and the means for being exposed are arranged with their end faces opposing each other, and the lens and the means for being exposed are arranged with their end faces opposing each other.

18. The vehicle headlight according to claim 17, wherein the means for being exposed shields a joint between the body case and the lens.

19. The vehicle headlight according to claim 17, wherein the means for being exposed is formed opaquely.

20. The vehicle headlight according to claim 17, wherein the means for being exposed serves as a reflector.

21. The vehicle headlight according to claim 17, wherein the body case and the lens are connected to each other via the means for being exposed.

22. The vehicle headlight according to claim 21, wherein a rib is provided inside of the body case, and a recess for receiving the rib is formed inside of the means for being exposed, so that the rib and the recess are connected to each other in a fixed manner.

23. The vehicle headlight according to claim 22, wherein the rib is provided adjacent to an outer surface of the body case, and the recess is formed adjacent to the outer surface of the means for being exposed.

24. The vehicle headlight according to claim 21, wherein a rib is provided inside of the means for being exposed, and a recess, for receiving the rib is formed inside of the body case, so that the rib and the recess are connected to each other in a fixed manner.

25. The vehicle headlight according to claim 24, wherein the rib is provided adjacent to an outer surface of the means for being exposed, and the recess is formed adjacent to an outer surface of the body case.

26. The vehicle headlight according to claim 17, wherein the hood is formed between a first opening in a center part of the means for being exposed and a second opening in the means for being exposed.

* * * * *